April 22, 1952
ELLARD G. KOHN
NOW BY CHANGE OF NAME
ELLARD G. CONN
HEATING KETTLE
2,593,768
Filed Aug. 17, 1948
2 SHEETS—SHEET 1
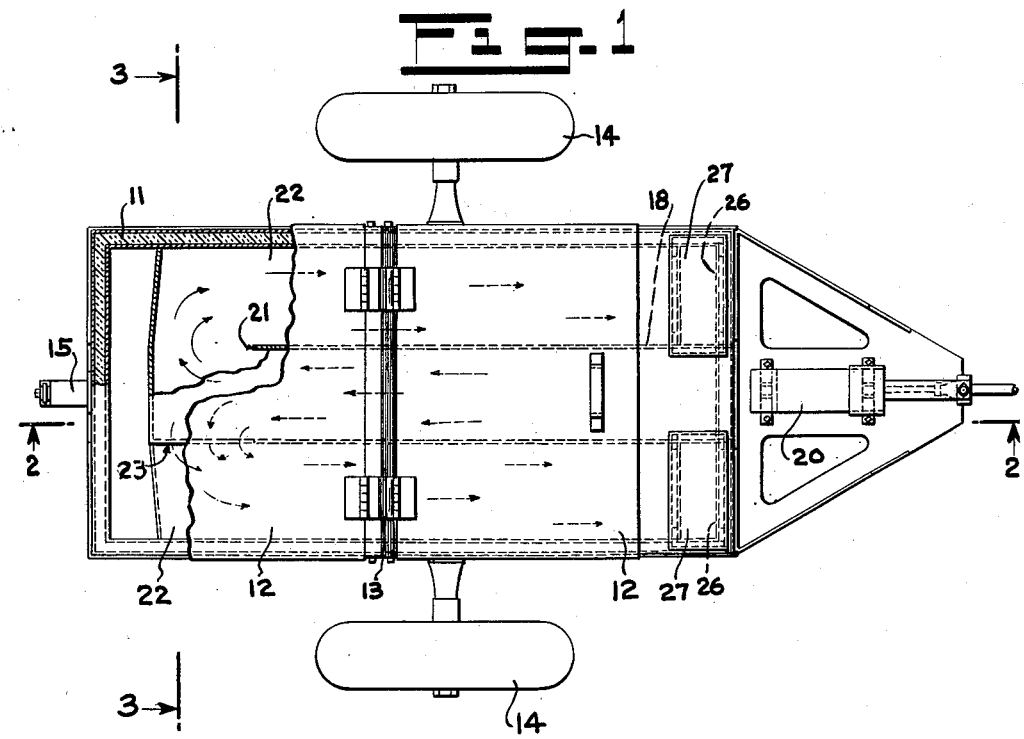
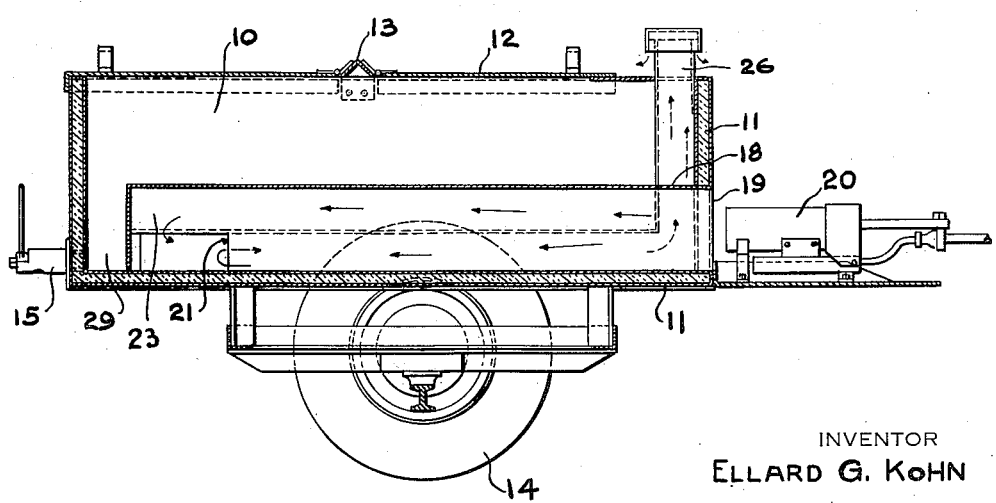
INVENTOR
ELLARD G. KOHN
ATTORNEYS

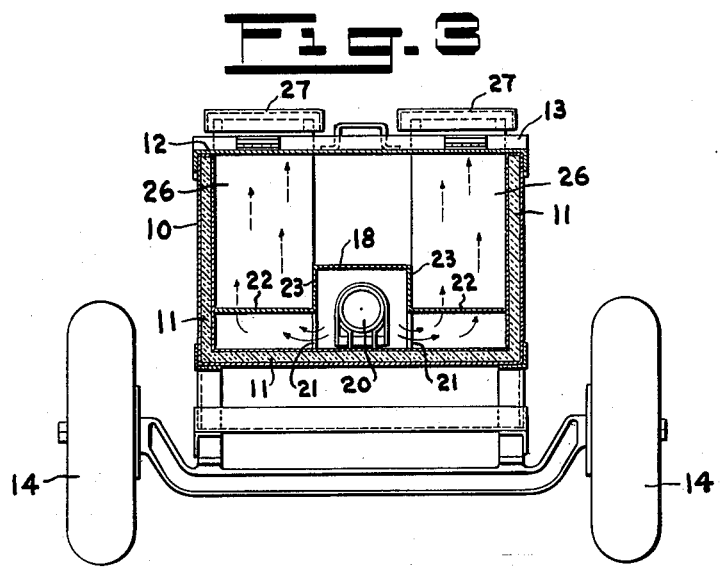

Patented Apr. 22, 1952

2,593,768

UNITED STATES PATENT OFFICE 2,593,768

HEATING KETTLE

Ellard G. Kohn, Miami Beach, Fla., now by change of name Ellard G. Conn

Application August 17, 1948, Serial No. 44,751

4 Claims. (Cl. 126—343.5)

The invention relates to a heating kettle such as may be used for heating asphalt, tar and the like. The heating kettle comprises a receptacle for the asphalt, tar or the like to be heated and made fluid or soft, which is preferably insulated and a burner such as an oil or gas burner may be used to heat the kettle. The heat from the burner is generally passed through flues in the heating kettle. Heretofore the flues and receptacle have been difficult to clean of the carbon deposited thereon. The heating kettle to be described herein provides an efficient kettle and furthermore provides a construction such that it is an easy matter to clean the flues and receptacle of the carbon deposit.

It is an object of the invention to construct a heating kettle for tar and the like which is efficient, has flues permanently mounted therein, and is readily cleaned.

Another object of the invention is to construct a heating kettle having a burner flue of flat surfaces forming the bottom of the heater with a center flue and two return flues of lesser height.

Another object is to construct a heating kettle in which the flues are flat surfaced for easy cleaning and form the entire bottom of the heating kettle excepting that the flues do not extend completely to the far or end wall so that a drainage channel is formed thereby.

Other objects of the invention will be apparent from the following description when taken in conjunction with the accompanying drawings in which:

Figure 1 is a plan view of the heating kettle with a portion thereof in section;

Figure 2 is a longitudinal section taken on line 2—2 of Figure 1; and

Figure 3 is a cross section taken on the line 3—3 of Figure 1.

The heating kettle includes a receptacle or container 10 the walls of which usually carry insulation 11 for the sides and bottom thereof. The top has a cover means, such as a lid or hinged cover or covers of any form, that shown being two doors 12 hinged on a center bar 13 so that tar and asphalt may be thrown therein and so that the kettle or receptacle may be fully opened for scraping the sides and flues clean of carbon. The kettle is usually mounted upon wheels 14 to form a trailer so that it may be pulled anywhere needed and so that it may be easily tilted to permit drainage towards a pouring spout 15 or cock in the end wall.

It is the arrangement and construction of flues within the kettle or receptacle 10 which is of particular advantage. The flues comprise a center flue 18 having flat surfaces and it is shown as being square in cross section although any other cross sectional form is suitable. One end 19 of the flue opens through the end wall of the kettle into which a burner 20 projects its flame. The other end of the center flue has an opening 21 on each side thereof leading to side return flues 22. These side flues also are flat surfaced and where the center flue has a square cross section, the former may be half as high. The two side flues together, therefore, provide and preferably have a cross sectional area which is equal to the cross sectional area of the center flue. Preferably these side flues are in contact with the center flue and extend to the inner wall of the receptacle so that the bottom of the kettle is entirely or primarily the top surface of the flues and the portion 23 of the side surfaces of the center flue which project above the adjacent side flues. In the construction as shown the side wall of the center flue forms a side wall of the side return flue.

At the burner end of the side flues a chimney or outlet means may be provided. The construction shown is a vertical flue 26 for each side flue 22. These may be anywhere desired; however, it is simpler to have them within the receptacle and extending vertically along the end wall thereof so that their heat also aids in melting the tar or the like within the kettle. A cap 27 may be fitted over the end of the chimneys.

Since the flues are flat surfaced, it is a simple matter to clean them by running a scraper thereover. The flues may be permanently fixed within the receptacle and need not be removed for a thorough cleaning. Since the center flue projects above the side flues it provides considerable area for transmitting the heat from the burner to the tar.

The center flue 18 and the side flues 22 preferably do not extend the full length of the interior of the kettle or receptacle so that a trough 29 is formed at the end of the flues and at the end of the receptacle from the bottom of which the spout 15 leads. This means that all of the melting tar flows to the trough and hence all of the melting tar will flow out of the spout. By tilting the kettle slightly on its wheels with the trough and spout end lower, all of the tar will flow to the trough.

The kettle described is inexpensive to manufacture, is simple to maintain, and clean and is efficient in its operation. The inner surfaces are easily accessible and the heating flues need not be removed for cleaning. The side by side relation of the flues and their extending from wall to wall of the receptacle permits the side flue to be constructed by a top plate only bent down at one end to form an end wall thereby conserving material and labor.

This invention is presented to fill a need for improvements in a heating kettle. It is understood that various modifications in structure, as well as changes in mode of operation, assembly, and manner of use, may and often do occur to those skilled in the art, especially after benefiting from the teachings of the invention. Hence, it will be understood that this disclosure is illustrative of preferred means of embodying the invention in useful form by explaining the construction, operation and advantages thereof.

What is claimed is:

1. A heating kettle comprising a container having four walls including two end walls and two side walls and a bottom, a center flue extending from one end wall of the container towards the opposite end wall and having flat sides, the center flue being irremovably fixed to the bottom of the container, the end of the center flue opening through said one end wall before which a heating means is adapted to be mounted, a pair of return flues one on each side of the center flue and connected therewith at one end, the return flues being irremovably fixed to the bottom of the kettle, the return flues and center flue being in side by side contact and their top surfaces being flat and forming at least a portion of the inner bottom of the kettle, the center flue extending above the top of the return flues, outlet means for the return flues, cover means for the kettle, and an outlet adjacent the bottom of the container extending through a wall thereof.

2. A heating kettle as in claim 1 in which the flues extend from side wall to side wall of the container.

3. A heating kettle as in claim 1 in which said outlet means includes a vertical flue for each return flue fixed in the corner of the end wall and adjacent side wall of the kettle, and the end of each return flue is connected with a vertical flue.

4. A heating kettle comprising a container having four walls including two end walls and two side walls and a bottom, a center flue extending from one end wall of the container towards the opposite end wall and having flat sides, the center flue being fixed to the bottom of the container, the end of the center flue opening through one end wall before which a heating means is adapted to be mounted, a pair of return flues one on each side of the center flue and connected therewith at one end, the return flues being fixed to the bottom of the container, the return flues and center flue being in side by side contact and their top surfaces being flat and forming at least a portion of the inner bottom of the kettle, the flues extending to a point adjacent the opposite end wall, means closing the ends of the flues and forming a trough with a part of the adjacent end wall, the side walls and bottom of the kettle, outlet means for the return flues, cover means for the kettle, and an outlet adjacent the bottom of the trough extending through a wall of the container.

ELLARD G. KOHN.

REFERENCES CITED

The following references are of record in the file of this patent:

UNITED STATES PATENTS

| Number | Name | Date |
|---|---|---|
| Re. 1,565 | Drake | Nov. 10, 1863 |
| 130,996 | Hazen | Sept. 3, 1872 |
| 208,135 | Allard | Sept. 17, 1878 |
| 520,941 | Springfels | June 5, 1894 |
| 535,911 | Kuwitzky | Mar. 19, 1895 |
| 747,584 | Braun | Dec. 22, 1903 |
| 1,433,755 | Swiers | Oct. 31, 1922 |
| 2,041,359 | Littleford, Jr. | May 19, 1936 |
| 2,048,299 | Schumann | July 21, 1936 |
| 2,176,869 | Childs | Oct. 24, 1939 |
| 2,368,177 | Turpin | Jan. 30, 1945 |